(12) United States Patent
Vuylsteke et al.

(10) Patent No.: US 11,814,030 B2
(45) Date of Patent: Nov. 14, 2023

(54) ELECTRIFIED VEHICLE CONTROL USING BATTERY STATE OF CHARGE AND POWER CAPABILITY STRATEGY

(71) Applicant: Ford Global Technologies, LLC, Dearborn, MI (US)

(72) Inventors: Gabrielle Vuylsteke, Ann Arbor, MI (US); Marcelo Araujo Xavier, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 312 days.

(21) Appl. No.: 16/936,054

(22) Filed: Jul. 22, 2020

(65) Prior Publication Data

US 2022/0024438 A1 Jan. 27, 2022

(51) Int. Cl.
*G01R 31/36* (2020.01)
*B60W 20/00* (2016.01)
(Continued)

(52) U.S. Cl.
CPC ............ *B60W 20/00* (2013.01); *B60W 10/06* (2013.01); *B60W 10/08* (2013.01); *B60W 10/24* (2013.01);
(Continued)

(58) Field of Classification Search
CPC ........... B60L 2240/545; G01R 31/367; B60W 20/00; B60W 10/06; B60W 10/08;
(Continued)

(56) References Cited

U.S. PATENT DOCUMENTS 6,534,954 B1 3/2003 Plett
8,294,416 B2 * 10/2012 Birke ...................... B60L 58/13
320/134
(Continued)

FOREIGN PATENT DOCUMENTS

CA 2588334 A1 6/2006

OTHER PUBLICATIONS

Dyche Anderson et al.; Battery Power Capability Estimation: Algorithm and Implementation; Ford Motor Company; pp. 1-17; Sep. 17, 2014.
(Continued)

*Primary Examiner* — Gonzalo Laguarda
(74) *Attorney, Agent, or Firm* — BROOKS KUSHMAN PC; David Kelley

(57) ABSTRACT

A vehicle and control method include a traction battery, a temperature sensor, current sensor, and voltage sensor associated with the traction battery, an electric machine powered by the traction battery to provide propulsive power to the vehicle, and a controller configured to control at least one of the electric machine and the traction battery in response to a battery state of charge (SOC) estimated using a battery model having parameters including a first resistance in series with a second resistance and a capacitance in parallel to the second resistance. The battery model parameters are adjusted during vehicle operation using a Kalman filter and reinitialized to new values in response to a vehicle key-on, in response to a change in the battery current exceeding a corresponding threshold, and/or in response to any of the parameter values crossing an associated limit.

19 Claims, 7 Drawing Sheets

(51) Int. Cl.
  *B60W 10/24* (2006.01)
  *B60W 10/06* (2006.01)
  *B60W 10/08* (2006.01)
(52) U.S. Cl.
  CPC . *B60W 2510/244* (2013.01); *B60W 2510/246* (2013.01); *B60W 2510/248* (2013.01)
(58) Field of Classification Search
  CPC ........... B60W 10/24; B60W 2510/244; B60W 2510/246; B60W 2510/248
  See application file for complete search history.

(56) References Cited

U.S. PATENT DOCUMENTS

| | | | | |
|---|---|---|---|---|
| 9,533,597 | B2* | 1/2017 | Li | .............................. B60L 3/12 |
| 9,575,128 | B2 | 2/2017 | Frost et al. | |
| 9,718,455 | B2 | 8/2017 | Yu et al. | |
| 10,594,145 | B1* | 3/2020 | Wang | ................... G01R 31/392 |
| 10,732,227 | B2* | 8/2020 | Naumann | ............ G01R 31/389 |
| 10,884,475 | B1* | 1/2021 | Wang | .................... G06F 1/3296 |
| 2021/0188120 | A1* | 6/2021 | Wang | ...................... B60L 58/10 |
| 2021/0188125 | A1* | 6/2021 | Zhao | ........................ B60L 50/64 |
| 2021/0237614 | A1* | 8/2021 | Yao | ......................... B60L 15/20 |

OTHER PUBLICATIONS

Cunxue Wu et al.; Improved State of Charge Estimation for High Power Lithium Ion Batteries Considering Current Dependence of Internal Resistance; pp. 1-17; 2017.

Hairong Wang et al.; An Adaptive Kalman Filter Estimating Process Noise Covariance; Neurocomputing; pp. 1-6; 2017.

Wenjie Zhang et al.; An Improved Adaptive Estimator For State-Of-Charge Estimation Of Lithium-Ion Batteries; Journal of Power Sources; pp. 1-2; 2018.

Pawel Malysz; State-Of-Charge And State-Of-Health Estimation With State Constraints And Current Sensor Bias Correction For Electrified Powertrain Vehicle Batteries; IET Electrical Systems in Transportation; pp. 1-9; Jun. 9, 2015.

* cited by examiner

ELECTRIFIED VEHICLE CONTROL USING BATTERY STATE OF CHARGE AND POWER CAPABILITY STRATEGY

TECHNICAL FIELD

This disclosure relates to an electric vehicle and control strategy using a battery state of charge and power capability strategy.

BACKGROUND

Electrified vehicles may rely on a traction battery to provide power for propulsion. To provide desired vehicle performance, various properties and/or parameters of the traction battery may be monitored to control battery charging/discharging and vehicle operation. Battery power capability provides an indication of how much power the battery may supply or absorb at any particular time, while battery state of charge (SOC) provides an indication of the amount of charge stored in the battery.

Battery properties and/or parameters may be measured or otherwise determined directly or indirectly. Battery voltages and currents may be measured directly using sensors. Other battery properties may require that one or more parameters of the battery be estimated first. The estimated parameters may include resistances, capacitances, and voltages associated with the traction battery. The battery properties may then be calculated from the estimated battery parameters. Many prior art strategies are available for estimating the battery parameters, including implementing a Kalman filter model to recursively estimate the model parameters.

SUMMARY

In at least one embodiment, a vehicle comprises a traction battery having a plurality of cells, a temperature sensor configured to measure battery temperature of the traction battery, a current senor configured to measure battery current flow to and from the traction battery, a voltage sensor configured to measure output terminal voltage of the traction battery, an electric machine powered by the traction battery and configured to provide propulsive power to the vehicle, and a controller configured to control at least one of the electric machine and the traction battery in response to an estimated battery power capability based on a battery model having a plurality of model parameters reinitialized in response to at least one of the parameters exceeding a corresponding parameter limit. The controller may be further configured to reinitialize the plurality of model parameters in response to a change in battery current (delta battery current) exceeding a corresponding threshold. The plurality of model parameters may include a first resistance, a second resistance, and a capacitance of the battery model, wherein the first resistance is in series with the second resistance and the capacitance is in parallel with the second resistance. The controller may be further configured to adjust the first resistance, the second resistance, and the capacitance during operation of the vehicle using a Kalman filter. The controller may control at least one of the electric machine and the traction battery in response to a state of charge (SOC) of the traction battery, the SOC based on the plurality of model parameters, the battery temperature, the battery current, and the battery terminal voltage. Each of the plurality of model parameters may be reinitialized to a previously stored value in response to a trigger condition, which may include a vehicle key-on, a parameter value crossing a limit, or a delta battery current exceeding a threshold. The vehicle may include a transceiver configured to wirelessly communicate vehicle data to a cloud server, wherein each of the plurality of model parameters is reinitialized to a value received from the cloud server. The vehicle may include an internal combustion engine coupled to the electric machine.

Embodiments may also include a vehicle comprising a traction battery, a temperature sensor configured to measure battery temperature of the traction battery, a current senor configured to measure battery current flow to and from the traction battery, a voltage sensor configured to measure output terminal voltage of the traction battery, an electric machine powered by the traction battery and configured to provide propulsive power to the vehicle, and a controller configured to control at least one of the electric machine and the traction battery in response to a battery state of charge (SOC) estimated using a battery model including a first resistance in series with a second resistance and a capacitance in parallel to the second resistance, wherein the first resistance, second resistance, and the capacitance are initialized to corresponding values in response to a change in the battery current exceeding a corresponding threshold. The first resistance, the second resistance, and the capacitance values are adjusted during operation of the vehicle based on a joint Kalman filter. The values for the first resistance, the second resistance, and the third resistance may be received wirelessly by the controller from a cloud server. The first resistance, the second resistance, and the capacitance values may be reinitialized in response to at least one of the values crossing a corresponding parameter limit. The vehicle may include an internal combustion engine. The controller may be further configured to determine a battery power capability based on the first resistance, the second resistance, and the capacitance. The first resistance, the second resistance, and the capacitance may be determined as a function of the battery temperature, the battery current, and age of the traction battery.

In at least one embodiment, a method for controlling an electrified vehicle, comprises, by a controller, initializing traction battery model parameters for a first resistance, a second resistance, and a capacitance in response to a vehicle key-on, and controlling at least one of an electric machine and the traction battery in response to a battery state of charge (SOC) and a battery power capability estimated using the battery model including the first resistance in series with the second resistance and the capacitance in parallel to the second resistance, wherein the first resistance, the second resistance, and the capacitance are adjusted during operation of the vehicle using a Kalman filter, and wherein the first resistance, the second resistance, and the capacitance are re-initialized to associated values in response to a change in the battery current exceeding a corresponding current threshold, and in response to at least one of the first resistance, the second resistance, and the capacitance exceeding associated parameter thresholds. The method may include determining at least one of the SOC and the battery power capability as a function of temperature of the traction battery. The method may include determining at least one of the SOC and the battery power capability as a function of age of the traction battery. The method may include determining at least one of the SOC and the battery power capability as a function of traction battery current. The method may also include wirelessly receiving values to initialize the first resistance, the second resistance, and the capacitance from a cloud server.

DETAILED DESCRIPTION

Figure 1:
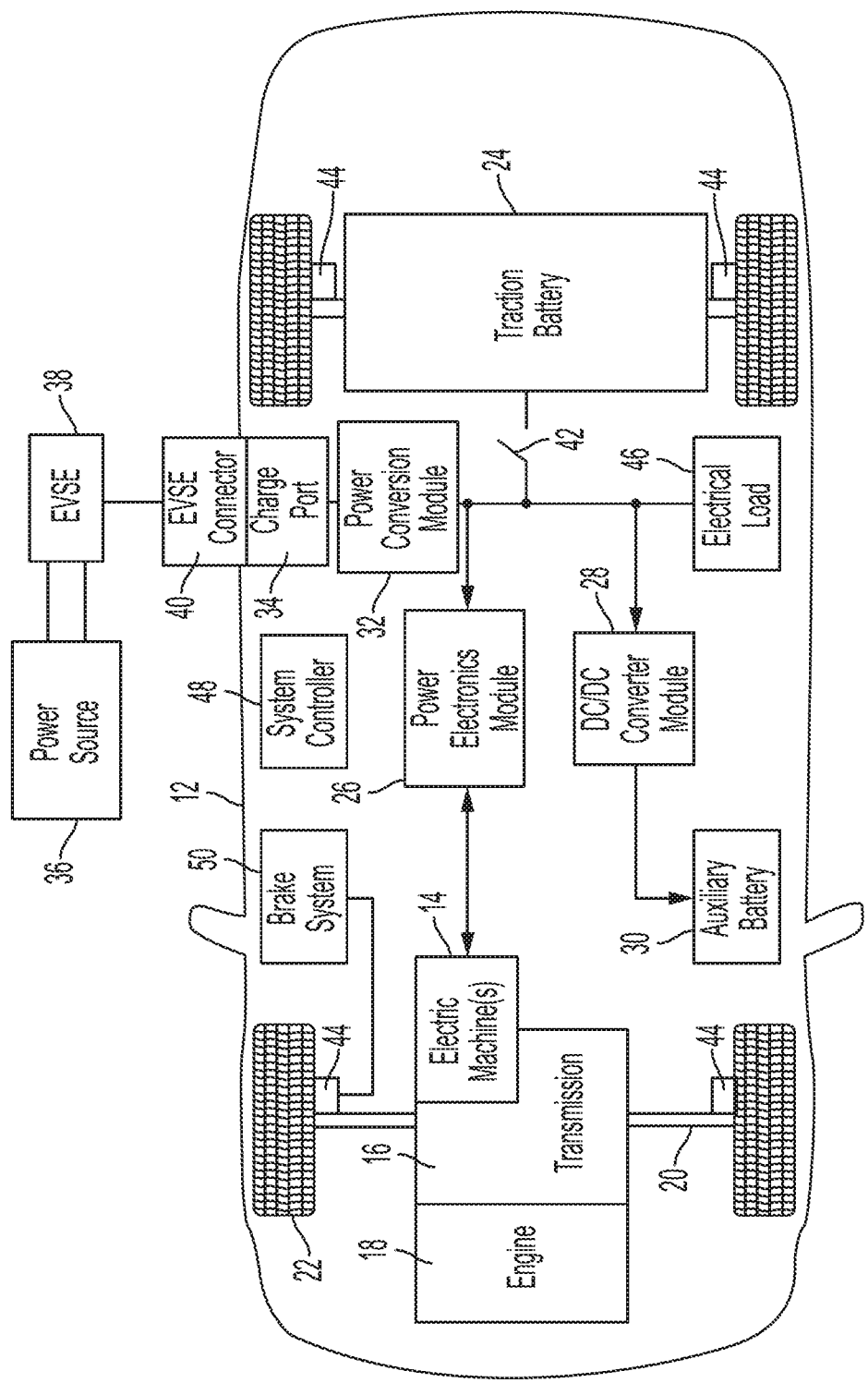
FIG. 1 is a diagram of a representative electrified vehicle illustrating typical drivetrain and energy storage components.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present disclosure recognizes that various prior art implementations for battery state estimates may not accurately match battery terminal measurements when operating at cold temperatures. Additionally, SOC estimation may be sensitive to current sensor bias, which can cause SOC drift in the absence of voltage-based updates such as those provided by one or more embodiments according to the present disclosure. In addition, extensive calibration may be required for existing strategies.

Various embodiments according to the disclosure may provide associated advantages relative to one or more prior art strategies. For example, one or more embodiments may provide engineering efficiencies by reducing calibration effort, while providing more accurate matching of battery terminal measurements, particularly when operating at cold temperatures. Unlike some existing technologies, embodiments according to the disclosure may provide battery state estimation using a Kalman filter strategy that accounts for various factors that influence parameter values to provide better accuracy across a wide range of operating conditions, such as temperature, SOC, and current, for example.

One or more embodiments according to the disclosure provide an added level of structural and mathematical complexity to a Kalman filter model with the goal of reducing calibration efforts and increasing estimation accuracy. By adding more dynamic Kalman Filter inputs, dependencies to the initialization parameters, and parameter limits, the control model and estimator produce more accurate states, particularly SOC, that can be used to inform additional control algorithms and can replace extensive lookup tables used in various prior art strategies, which would otherwise require significant engineering resources for calibration.

The high-level structure of various embodiments illustrated and described in detail with respect to the Figures includes sensors to measure battery temperature, terminal voltage, and current. These sensors feed current and, when available, an at-rest voltage/OCV (open circuit voltage) measurement to the measurement-based SOC estimation and all three measurements to the Kalman Filter. In at least one embodiment, a Randles circuit is used with a single RC pair having a first resistance in series with an RC pair, i.e. a second resistance and a capacitance in parallel with the second resistance. Other implementations may use a higher order equivalent circuit model (e.g. more RC pairs). Again, the Kalman Filter is used to adapt the control model parameters including at least the first resistance, the second resistance, and the capacitance. Other states should capture the voltage across any RC pairs and either SOC or OCV.

In various embodiments, system measurements for terminal voltage, current, and temperature are passed to the Kalman Filter. The battery impedance initialization parameters are dependent on current, temperature, and SOC. This allows non-linear impedance behavior at low temperatures (below about 25° C., for example) to be included in the parameter rather than as noise around a nominal value. This may be accomplished via a lookup table, physics-based equations, physics-inspired fit equations, or some combination thereof.

Added inputs to the Kalman Filter include state and noise covariance, which may be a function of battery temperature and battery aging, parameter limits, which may depend on battery temperature and battery aging, and initialization for non-parameter states (e.g. voltages over RC pairs and OCV/SOC). Embodiments may also adjust covariance of the Kalman Filter during initialization to increase the speed of filter convergence as this permits using smaller covariance values when the behavior of the battery is well understood and predictable (e.g. temperatures above 25° C., battery beginning of life) and larger values when this is not the case.

Implementing parameter limits, such as a maximum and minimum resistance values for at least the first resistance and the second resistance for operation in a specific temperature range, prevents the Kalman Filter from driving parameters to non-physical values. As this strategy uses the OCV/SOC state to estimate the true SOC, it is desirable for the battery model to be accurate. Parameter limits may be determined based on physical properties driving battery behavior, or empirically determined. Depending on implementation, these limits may be set on Kalman Filter initialization or may be adjusted dynamically with measured battery temperature change.

In one or more embodiments, an additional Kalman Filter input provides initialization for non-parameter states. Starting non-parameter states like OCV, SOC, and RC pair voltages at reasonable initial states increases the convergence speed (reduces convergence time) of the Kalman Filter. This may provide more accurate results sooner in the case that a battery does not fully relax between drive events (e.g. RC pair voltages cannot be assumed to be 0 V, terminal voltage may not be equal to OCV). In one embodiment, the non-parameter states are initialized using the last known or estimated values. Alternatively, the non-parameter states may be initialized by estimating the current values based on last known parameters and other known factors (such as time passed, battery aging, etc.).

FIG. 1 depicts a representative electrified vehicle, which is a plug-in hybrid electric vehicle (HEV) in this example. Vehicle 12 may comprise one or more electric machines 14 mechanically connected to a transmission 16. The electric machines 14 may be capable of operating as a motor or a generator. In addition, the transmission 16 is mechanically connected to an internal combustion engine 18. The transmission 16 is also mechanically connected to a drive shaft 20 that is mechanically connected to the wheels 22. The electric machines 14 can provide propulsion and regenerative braking capability when the engine 18 is turned on or off. During regenerative braking, the electric machines 14 act as generators and can provide fuel economy benefits by recovering energy that would normally be lost as heat in the friction braking system. The electric machines 14 may also reduce vehicle emissions by allowing the engine 18 to operate at more efficient speeds and allowing the hybrid-electric vehicle 12 to be operated in electric mode with the engine 18 off under certain conditions.

A traction battery or battery pack 24 stores energy that can be used by the electric machines 14. A vehicle battery pack 24 typically provides a high voltage DC output. The traction battery 24 is electrically connected to one or more power electronics modules. One or more contactors 42 may isolate the traction battery 24 from other components when opened and connect the traction battery 24 to other components when closed. A power electronics module 26 is also electrically connected to the electric machines 14 and provides the ability to bi-directionally transfer energy between the traction battery 24 and the electric machines 14. For example, a typical traction battery 24 may provide a DC voltage while the electric machines 14 may require a three-phase AC current to function. The power electronics module 26 may convert the DC voltage to a three-phase AC current as required by the electric machines 14. In a regenerative mode, the power electronics module 26 may convert the three-phase AC current from the electric machines 14 acting as generators to the DC voltage required by the traction battery 24. The description herein is equally applicable to a pure electric vehicle, often referred to as a battery electric vehicle (BEV). For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. The low-voltage systems may be electrically connected to an auxiliary battery 30 (e.g., 12V battery).

The electrified vehicle 12 may be an electric vehicle or a plug-in hybrid vehicle in which the traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of energy between the power source 36 and the vehicle 12. In other embodiments, the vehicle 12 may employ wireless charging, which may be referred to as hands-free or contactless charging that uses inductive or similar wireless power transfer.

The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically connected may transfer power using a wireless inductive coupling as previously described.

One or more wheel brakes 44 may be provided for friction braking of the vehicle 12 and preventing motion of the vehicle 12. The wheel brakes 44 may be hydraulically actuated, electrically actuated, or some combination thereof. The wheel brakes 44 may be a part of a brake system 50. The brake system 50 may include other components that are required to operate the wheel brakes 44. For simplicity, the figure depicts a single connection between the brake system 50 and one of the wheel brakes 44. A connection between the brake system 50 and the other wheel brakes 44 is implied. The brake system 50 may include a controller to monitor and coordinate the brake system 50. The brake system 50 may monitor the brake components and control the wheel brakes 44 to achieve desired operation. The brake system 50 may respond to driver commands and may also operate autonomously to implement features such as stability control. The controller of the brake system 50 may implement a method of applying a requested brake force when requested by another controller or sub-function.

One or more electrical loads 46 may be connected to the high-voltage bus. The electrical loads 46 may have an associated controller that operates the electrical load 46 when appropriate. Examples of electrical loads 46 may be a heating module or an air-conditioning module.

The various components discussed may have one or more associated controllers to control and monitor the operation of the components. The controllers may communicate via a serial bus (e.g., Controller Area Network (CAN)) or via discrete conductors. In addition, a system controller 48 may be present to coordinate the operation of the various components.

Figure 2:
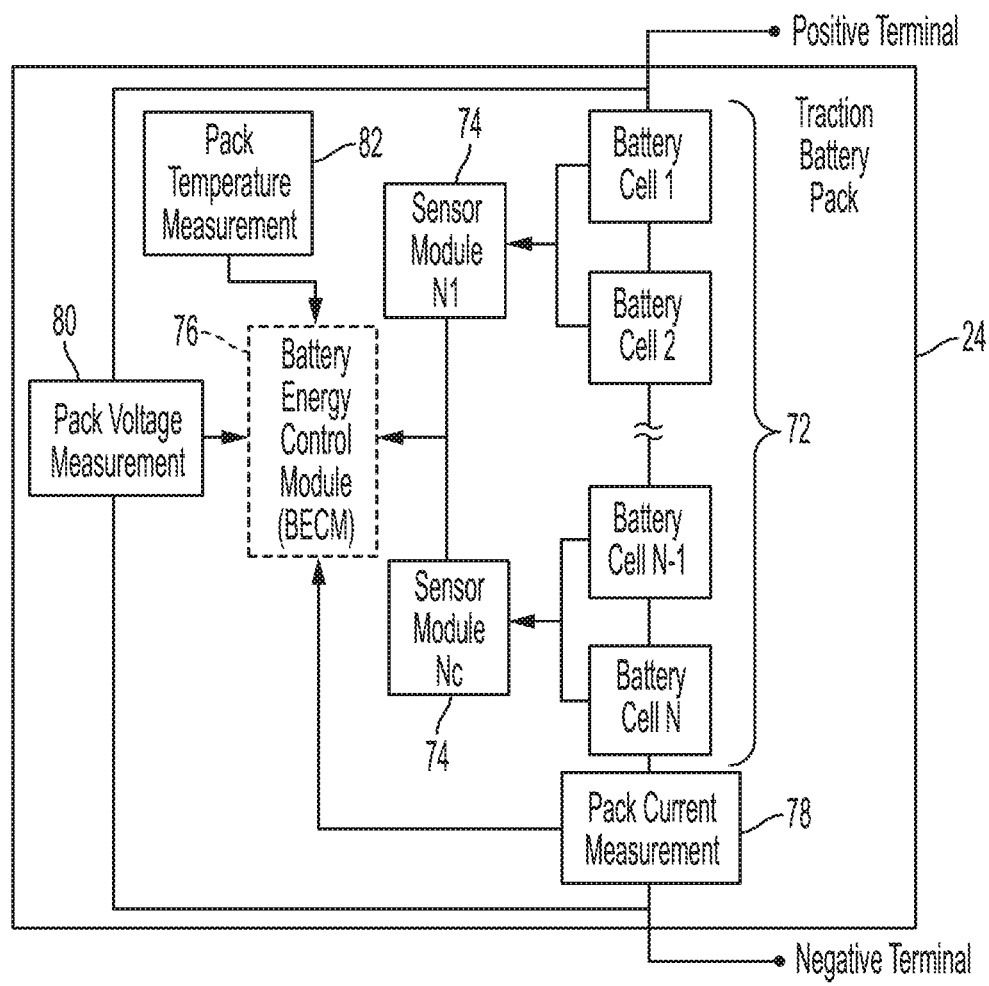
FIG. 2 is a diagram of a representative battery pack arrangement having multiple cells and monitored and controlled by a Battery Energy Control Module.

A traction battery 24 may employ a variety of chemical formulations. Typical battery pack chemistries may be lead-acid, nickel-metal hydride (NIMH) or lithium-ion. FIG. 2 shows a typical traction battery pack 24 in a simple series configuration of N battery cells 72. Other battery packs 24 may be composed of any number of individual battery cells connected in series or parallel or some combination thereof. A typical system may have one or more controllers, such as a Battery Energy Control Module (BECM) 76 that monitors and controls the performance of the traction battery 24. The BECM 76 may monitor several battery pack level characteristics such as pack current 78, pack voltage 80 and pack temperature 82. The BECM 76 may have non-volatile memory such that data may be retained when the BECM 76 is in an off condition. Retained data may be available upon the next key cycle.

In addition to the pack level characteristics, there may be battery cell 72 level characteristics that are measured and monitored. For example, the terminal voltage, current, and temperature of each cell 72 may be measured. A system may use a sensor module 74 to measure the battery cell 72 characteristics. Depending on the capabilities, the sensor module 74 may measure the characteristics of one or multiple of the battery cells 72. The battery pack 24 may utilize up to Nc sensor modules 74 to measure the characteristics of all the battery cells 72. Each sensor module 74 may transfer the measurements to the BECM 76 for further processing and coordination. The sensor module 74 may transfer signals in analog or digital form to the BECM 76. In some embodiments, the sensor module 74 functionality may be incorporated internally to the BECM 76. That is, the sensor module 74 hardware may be integrated as part of the circuitry in the BECM 76 and the BECM 76 may handle the processing of raw signals.

Various embodiments measure, calculate or otherwise determine various characteristics, properties, and/or parameters of the battery pack to control operation of the battery pack and/or the vehicle 12. Quantities such a battery power capability and battery state of charge (SOC) may be used for controlling the operation of the battery pack during charging/discharging while the vehicle is operating as well as any electrical loads receiving power from the battery pack. Battery power capability provides an indication of the amount of power the battery can provide or the amount of power that the battery can receive or store. The battery power capability may be used to manage electrical loads such that the power requested is within desired limits for the particular battery or operating conditions.

Battery pack state of charge (SOC) provides an indication of the amount of charge remaining in the battery pack. The battery pack SOC may be output or broadcast by the vehicle network to inform the driver of remaining charge and/or estimated travel distance, similar to a fuel gauge. The battery pack SOC may also be used to control the operation of an electric or hybrid-electric vehicle. Calculation of battery pack SOC can be accomplished by a variety of methods. One possible method of calculating battery SOC is to perform an integration of the battery pack current over time. This is well-known in the art as ampere-hour (or amp-hour) integration. One possible disadvantage to this method is that the current measurement may be noisy. Possible inaccuracy in the SOC may occur due to the integration of this noisy signal over time. In various embodiments, a change or delta battery current exceeding a corresponding parameter limit triggers reinitialization of battery model parameters as described in greater detail herein.

Figure 3:
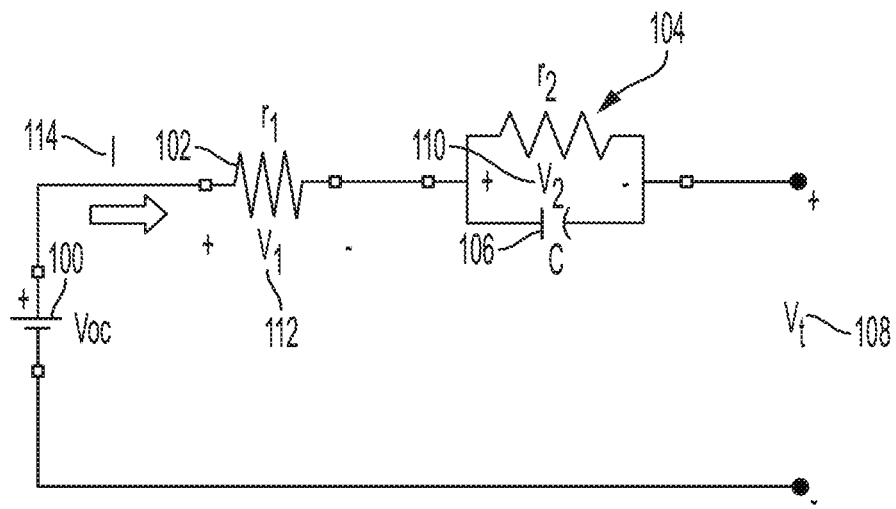
FIG. 3 is a diagram of an example battery cell equivalent circuit.

A battery cell may be modeled as an equivalent circuit. FIG. 3 shows one possible battery cell equivalent circuit model (ECM). A battery cell may be modeled as a voltage source (Voc) 100 having associated resistances (102 and 104) and capacitance 106. Voc 100 represents the open-circuit voltage of the battery. The model includes an internal resistance, r1 102, a charge transfer resistance, r2 104, and a double layer capacitance, C 106. The voltage V1 112 is the voltage drop across the internal resistance 102 due to current 114 flowing through the battery. The voltage V2 110 is the voltage drop across the parallel combination of r2 and C due to current 114 flowing through the combination. The voltage Vt 108 is the voltage across the terminals of the battery (terminal voltage).

Because of the battery cell impedance, the terminal voltage, Vt 108, may not be the same as the open-circuit voltage, Voc 100. The open-circuit voltage, Voc 100, may not be readily measurable as only the terminal voltage 108 of the battery cell is accessible for measurement. When no current 114 is flowing for a sufficiently long period of time, the terminal voltage 108 may be the same as the open-circuit voltage 100. A sufficiently long period of time may be necessary to allow the internal dynamics of the battery to reach a steady state. When current 114 is flowing, Voc 100 may not be readily measurable and the value may need to be inferred based on the circuit model. The impedance parameter values, r1, r2, and C may be known or unknown. The value of the parameters may depend on the battery chemistry. While the representative embodiment illustrated uses a relatively simple equivalent circuit model, a higher order equivalent circuit model having more RC pairs may be used.

As described in greater detail below, control of the vehicle may include initializing traction battery model parameters for the first resistance (r1), the second resistance (r2), and the capacitance (C) in response to a vehicle key-on and controlling at least one of the electric machine 14 and the traction battery 24 in response to a battery state of charge (SOC) and a battery power capability estimated using the battery model including the first resistance (r1) in series with the second resistance (r2) and the capacitance (C) in parallel to the second resistance (r2), wherein the first resistance, the second resistance, and the capacitance are adjusted during operation of the vehicle using a Kalman filter, and wherein the first resistance, the second resistance, and the capacitance are re-initialized to associated values in response to a change in the battery current exceeding a corresponding current threshold, and in response to at least one of the first resistance, the second resistance, and the capacitance exceeding associated parameter thresholds.

Figure 4:
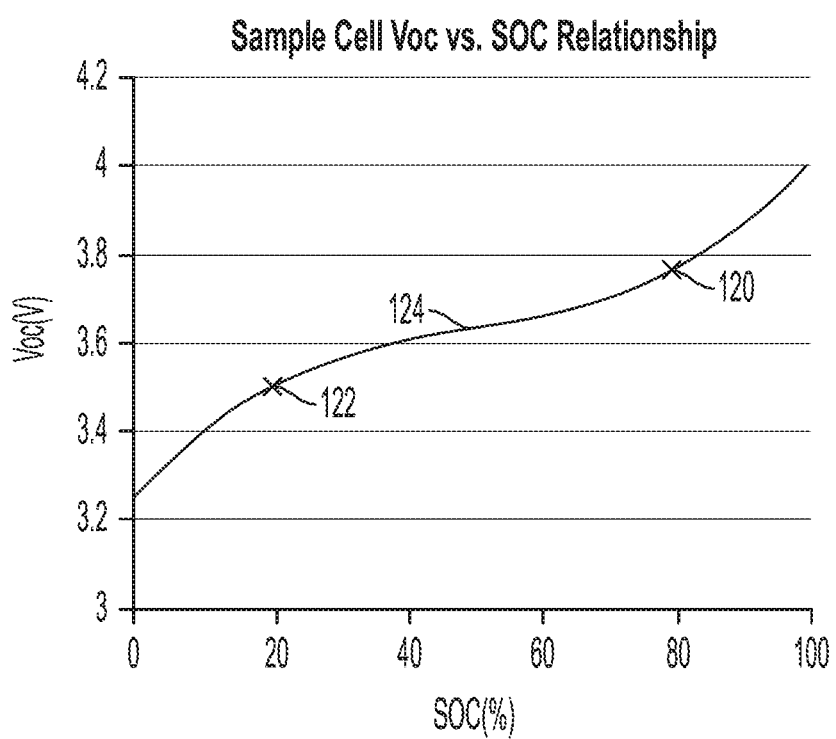
FIG. 4 is a graph illustrating a possible open-circuit voltage (Voc) vs. battery state of charge (SOC) relationship for a representative battery cell.

For a typical battery cell, there is a relationship between SOC and the open-circuit voltage (Voc) such that Voc=f (SOC). FIG. 4 shows a typical curve 124 showing the open-circuit voltage Voc as a function of SOC for a representative lithium-ion battery. The relationship between SOC and Voc may be determined from an analysis of battery properties or from testing the battery cells. The function may be such that SOC may be calculated using the inverse function of Voc. The function or the inverse function may be implemented as a table lookup or an equivalent equation within a controller. The exact shape of the curve 124 may vary based on the particular formulation of the lithium-ion battery. The voltage Voc changes as a result of charging and discharging of the battery. The term df(soc)/dsoc represents the slope of the curve 124.

Figure 5:
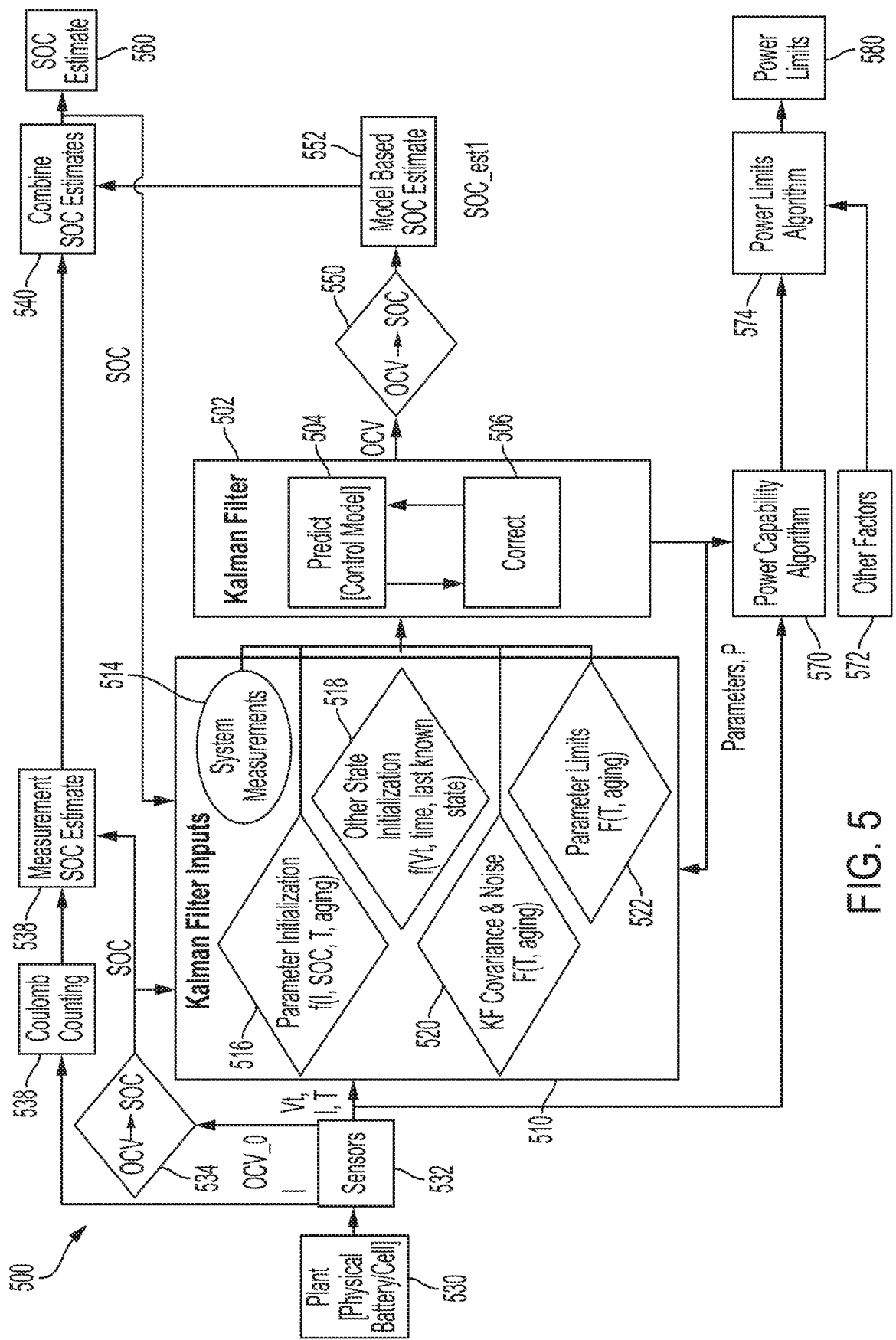
FIG. 5 is a block diagram illustrating operation of a controller or control strategy that uses a Kalman filter model with parameter limits and initialization to estimate battery power capability and SOC according to a representative embodiment.

FIG. 5 is a block diagram illustrating operation of a controller or control strategy 500 that uses a Kalman filter 502 model with parameter limits 522 and strategic initialization or re-initialization 516, 518 of one or more battery model parameter values to improve convergence of the Kalman filter and accuracy of estimated battery power capability and SOC according to a representative embodiment. Controller or control strategy 500 includes a Kalman filter 502, which is a recursive algorithm or model to predict 504 and correct 506 model parameter values based on inputs 510 to provide a traction battery SOC estimate 560 as well as a traction battery power capability 570. Inputs 510 may include system measurements for terminal voltage, current, and temperature that are passed to the Kalman Filter 502. The battery impedance initialization parameters are dependent on current, temperature, and SOC. This allows nonlinear impedance behavior at low temperatures (below about 25° C.) to be included in the parameter rather than as noise around a nominal value. This could be accomplished via a lookup table, physics-based equations, physics-inspired fit equations, or some combination thereof.

Added inputs 510 to the Kalman Filter 502 may include state and noise covariance 520 (which may be a function of temperature and battery aging), parameter limits (also dependent on temperature and aging), and initialization for non-parameter states (e.g. voltages over RC pairs and OCV/SOC). Adjusting the covariance of the Kalman filter 502 during initialization will increase the speed of filter convergence since this permits using smaller covariance values when the behavior of the battery is well understood and predictable (e.g. temperatures above 25° C., battery beginning of life) and larger values when this is not the case, as described in greater detail herein.

While attempting to minimize error between the modeled and measured terminal voltage, the Kalman Filter 502 may drive states to be unrealistic. Implementing parameter limits, such as a maximum and minimum resistance value for operation in a specific temperature range, prevents the Kalman Filter 502 from driving parameters to non-physical values. As this strategy uses the OCV/SOC state to estimate the true SOC, accuracy of the SOC depends on accuracy of the battery model. Parameter limits should ideally be routed in physical understanding of battery behavior but can also be empirically determined. Depending on implementation, these limits may be set on Kalman Filter initialization or may be adjusted dynamically with measured temperature change.

Kalman Filter inputs may also initialize for non-parameter states as represented at 518. In the case that a battery does not fully relax between drive events (e.g. RC pair voltages cannot be assumed to be 0 V, terminal voltage will not match OCV), starting non-parameter states like OCV, SOC, and RC pair voltages at reasonable initial states will increase Kalman Filter convergence speed. This could be done by simply using the last known or estimated values or by estimating the current values based on last known parameters and other known factors (time passed, battery aging, etc.) as described herein.

As also shown in FIG. 5, the output parameters (P) may be provided to the Kalman filter inputs 510, which may also include various system measurements 514 provided by associated sensors. Battery model parameters are initialized to starting values as represented at 516, which may be a function of battery current (i), SOC, battery temperature (T), and/or battery aging depending on the particular application or implementation. Battery model parameters may include at least a first resistance, second resistance, and capacitance as previously described, although other parameters may also be initialized or re-initialized. Other non-parameter values or states may also be initialized or re-initialized as represented at 518. Kalman filter (KF) covariance and noise parameters may also be initialized or re-initialized as represented at 520. These values may be determined or otherwise selected as a function of battery temperature (T) and battery aging. The other state initialization may set values and/or states as a function of battery terminal voltage (Vt), time from previously stored values, or to a last known state or value. Associated parameter limits may be applied as represented at 522 so that any parameter values represent physically realistic values based on battery properties.

Block 530 represents the physical plant of the model, which includes the traction battery cells and bulk properties or parameters that are monitored or measured by corresponding sensors 532. In at least one embodiment, sensor 532 include a battery temperature sensor, a battery current sensor, and a battery voltage sensor. The battery voltage sensor may provide a terminal voltage across output terminals of the battery. Similarly, the battery current sensor provides an indication of battery current to/from the output terminals of the battery. Other sensors may be provided to measure current or voltage of individual battery cells or groups of cells connected together depending on the particular application and implementation. In one embodiment, battery temperature, battery current, and battery terminal voltage are measured by corresponding sensors and used during initialization or re-initialization of the KF inputs 510. These measured values may also be used by a power capability algorithm 570 in a similar manner. These sensors feed current and, when available, an at-rest voltage/OCV measurement to the measurement-based SOC estimation 536 and all three measurements to the Kalman Filter 502. This model may use the Randles circuit model illustrated in FIG. 3, or could be updated to use a higher order equivalent circuit model with more RC pairs as previously described. Again, the Kalman Filter 502 is used to adapt the control model parameters. Other states should capture the voltage across any RC pairs and either SOC or OCV.

The battery current (I) may also be provided for coulomb counting as represented at 538. The battery terminal voltage under no-load conditions and after a predetermined relaxation time may be provided as the open circuit voltage (OCV) to determine an SOC estimate as represented at 534 based on a corresponding relationship between OCV and SOC as previously described with reference to FIG. 4. This SOC value may also be used in determining the initial parameter values for KF inputs 510 as previously described. The measured SOC estimate using values measured by the battery sensors and accounting for coulomb counting at 538 is determined at 536 and subsequently combined with a model-based SOC value 552 at block 540 to provide the combined SOC estimate at 560. The model-based SOC estimate 552 is determined based on the modeled or estimated OCV provided by Kalman filter 502 using the battery model parameters based on current operating conditions. An estimated or modeled SOC is then determined at 550 based on the modeled or estimated OCV based on an OCV-SOC relationship as previously described.

Previous strategies for estimating SOC have relied on current integration, updates based on OCV measurements (when available), and an extremely large lookup table with inputs of current, temperature, and battery age. As previously described, this approach requires significant engineering resources to develop and maintain across various applications.

According to various embodiments of the present disclosure, the SOC estimate 560 is based on measurements (current integration and OCV), but instead of augmenting that estimate with a large SOC lookup table, the KF model-based SOC estimate is used. These two estimates are combined at 540 for the final SOC estimate 560 using the following equation.

$$SOC_{est} = a * SOC_{meas} + b * SOC_{model}$$

The weights or scaling factors used in this equation (a and b) are both non-negative and sum to unity and may vary based on a number of conditions, including how recently OCV has been measured, how much noise is present in the current measurement, and whether the Kalman filter has converged.

If a trustworthy OCV was measured within a given time interval (e.g. the last 20 minutes), the SOC "measurement" (based on current integration/Coulomb Counting) will not have had much time to drift due to current sensor error. In this case, the SOC measurement would be reasonably accurate and the related coefficient "a" is assigned a larger value. If it has been a long time since a trustworthy OCV measurement (e.g. 2 hours), the "a" coefficient is assigned a much smaller value because the SOC "measurement" may have drifted due to current sensor error.

If the noise in the current measurement is large or exceeds an associated threshold, the measured SOC will drift more quickly than if the noise was small, i.e. below a second associated threshold (or below the large threshold). In this situation, the value of "a" decreases more quickly as a function of elapsed time since OCV measurement increases than it would if noise was small. As noise in the current measurement could vary with current magnitude, temperature, or other factors, this relationship may be dynamic.

If the Kalman Filter has converged, the SOC value it estimates can be trusted more than if it has not yet converged. Therefore, the value for the "b" coefficient increases as the Kalman Filter converges to reasonable states. In a scenario where the measured SOC is trustworthy and "a" is close to one, the measured SOC value may be added as an output value for feedback in the Kalman Filter. As more is known about the system, the Kalman Filter is expected to converge more quickly and to an accurate value.

Battery power capability may be estimated by an associated algorithm as represented at 570 using the measured values from battery sensors 532 and battery parameter estimates from the Kalman filter 502. The battery power capability 570 is provided to a power limits algorithm 574, in combination with various other ambient and/or operating factors or conditions 572 to determine the battery power limits 580. The strategy described with respect to various embodiments will improve power limit estimation by ensuring that parameter estimates from the Kalman Filter make physical sense and can therefore provide reasonable power capabilities. This benefit should be captured whether the Power Limits estimation uses a previous strategy based on KF output parameters and other inputs, or if the power limit algorithm is changed.

Figure 6:
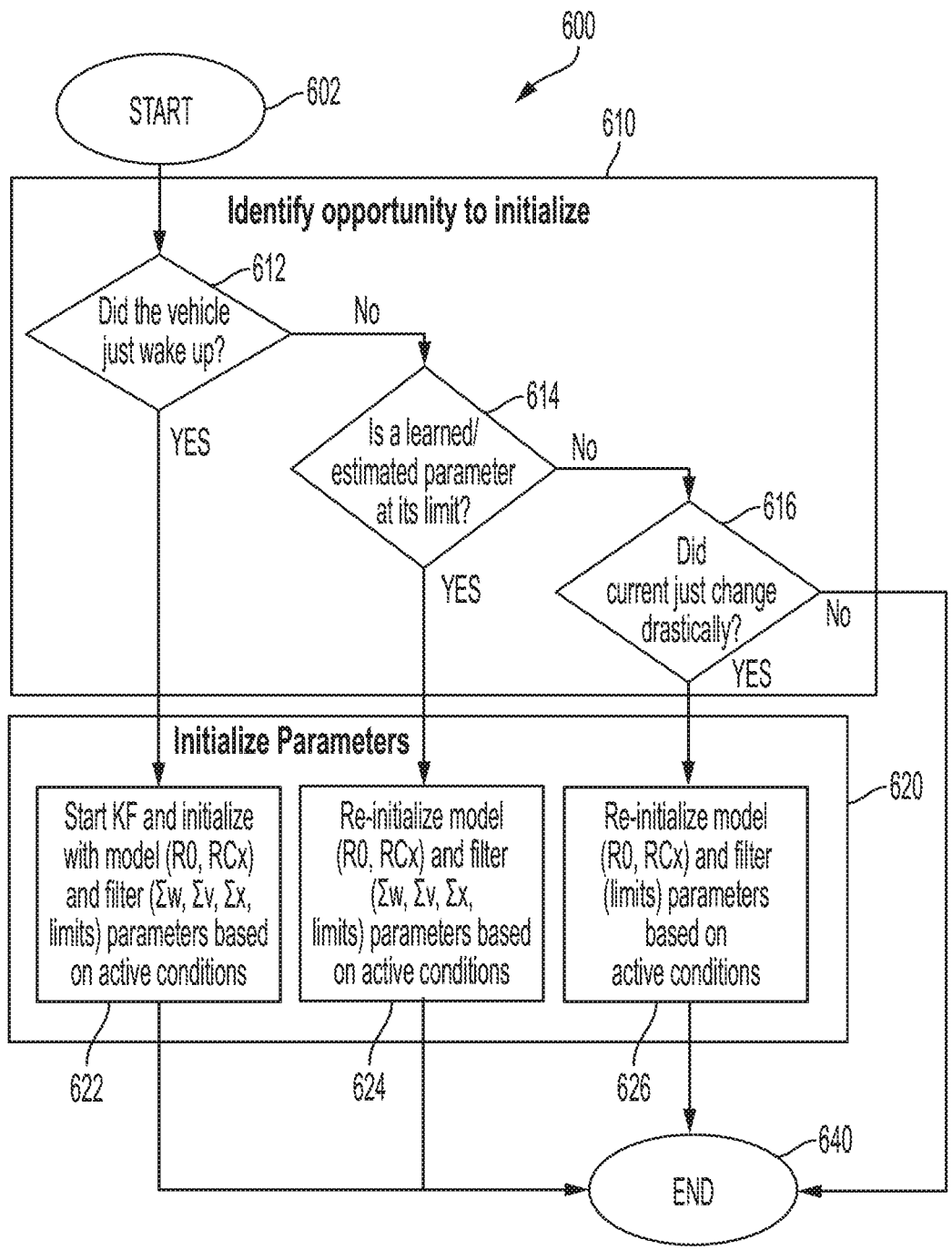
FIG. 6 is a block diagram illustrating operation of a controller or control strategy for initializing Kalman filter parameters.

FIG. 6 is a block diagram 600 illustrating operation of a controller or control strategy for initializing Kalman filter parameters. Various prior art strategies may initialize the Kalman filter only when the vehicle turns on or starts. If the battery temperature at start up is near the last measured temperature, it is initialized with the last estimated parameters. Otherwise, temperature-dependent parameters from a static (e.g. non-updateable) lookup table are used.

The present disclosure recognizes that in scenarios where the parameters are known to vary with current, SOC, and temperature (or a subset there of), requiring the Kalman Filter to correct for all variability may not be optimal. For example, if a change is not caused by noise and has an understood cause, the change could be accounted for in the inputs to the Kalman Filter. Because battery temperature and SOC are expected to change gradually, a Kalman Filter will adapt changes due to these parameters with little effort and it would be difficult to separate variation due to these parameters from noise-related variation. However, battery current is dynamic and parameter changes due to changing battery current are more challenging to capture with a Kalman Filter. Re-initializing parameters and parameter limits after each major change in current according to embodiments described herein allows inputs to account for current dependence.

In various embodiments, parameter limits are imposed to prevent unrealistic states. If limits are used to continuously cap parameter values, "windup" may occur and magnify non-physical behavior. According to one embodiment, the parameter states are updated with physically understood, nominal parameters by re-initializing the Kalman Filter in response to parameter values reaching corresponding limits. In other embodiments, parameter states are re-initialized if a parameter value is near an associated limit for an extended period of time. In both scenarios, re-initializing provides the Kalman Filter 502 an opportunity to re-start estimation for those state parameters from a reasonable value and still correct for variation due to noise. Other parameters and filter inputs may also be re-initialized to remove the influence of the unrealistic state depending on the particular application and implementation.

As illustrated in FIG. 6, one or more embodiments according to the present disclosure include initializing or re-initializing the Kalman Filter in response to various trigger conditions, which may include key-on, a model parameter reaching an associated limit, or if battery current changes significantly. The strategy starts at 602 to identify an opportunity or trigger condition to initialize or re-initialize one or more parameters 610 for the Kalman filter inputs. At least one parameter or non-parameter states may be initialized in response to a vehicle key-on as represented at 612, in response to one or more learned/estimated parameters reaching an associated limit value as represented at 614, or in response to a change or delta battery current exceeding a corresponding threshold as represented at 616. Any of the trigger conditions 612, 614, or 616 may initiate a re-initialization of parameter and/or state values as represented at 620. Otherwise, operation continues in response to none of the re-initialization criteria being satisfied as represented at 640.

In response to a vehicle key-on or wake-up as detected at 612, one or more battery model parameters/states may be initialized as represented at 622. This may include starting operation of the Kalman filter and initializing the battery model parameter values for the first resistance (r1) and one or more RC pairs (RCx), which include the second resistance (r2) and a capacitance (C) in parallel with the second resistance (r2). As previously described, the number of RC pairs may depend on the particular application and implementation of the equivalent circuit model of the battery. In addition, various other filter parameters and/or limits may be set to associated values as described in greater detail herein.

In response to a learned/estimated parameter value reaching an associated limit as represented at 614, various model parameters may be re-initialized based on current vehicle and/or ambient conditions as represented at 624. Similarly, in response to a change or delta battery current exceeding a corresponding threshold as represented at 616, various model parameters may be re-initialized based on current vehicle and/or ambient conditions as represented at 626.

Because of variation between battery packs and due to expected battery aging, it is desirable to be able to learn battery parameters. Properties like battery variation and aging are battery pack-specific and do not generally reverse, so it is valuable to save learned parameters to speed up convergence.

Depending on the format of the initialization's dependence on various parameters, such as a function, piece-wise function, lookup table, etc. for example, and the amount of complexity stored, the process of updating stored initialization parameters may be more or less complex. For applications where a simple dependence is used, such as a temperature-dependent lookup table with a scaling factor to account for low-temperature current-dependence, it may be possible to simply update the initialization procedure after each vehicle-event or drive-event based on the most recent learned values. However, for a more complex dependence, computation for updates may require more computing and storage resources than typically available on the vehicle. As such, various embodiments provide one or more cloud servers to perform more complex computation, analysis, and storage.

Figure 7:
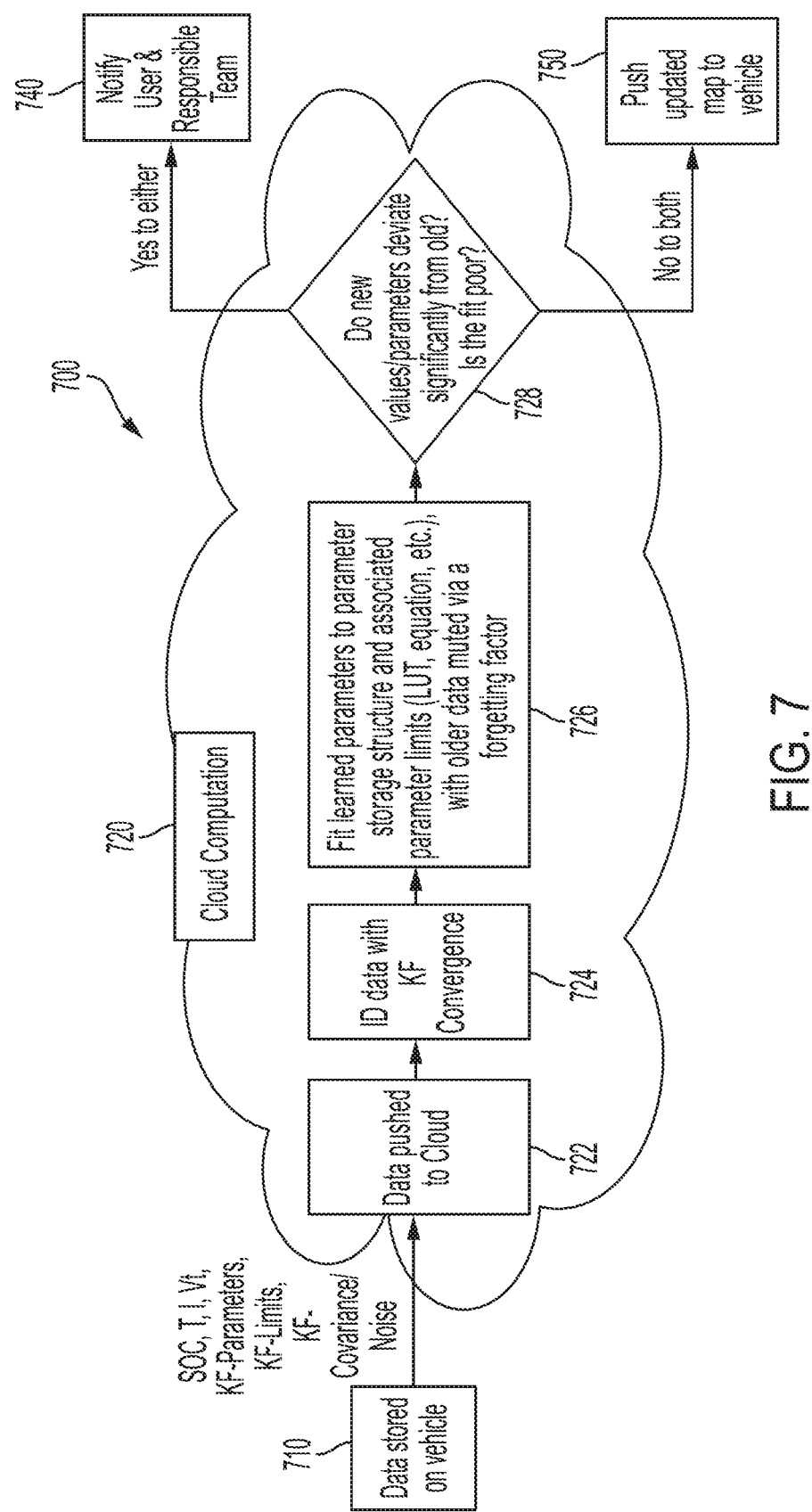
FIG. 7 is a block diagram illustrating operation of a controller or control strategy to update Kalman filter initialization values via cloud computation.

FIG. 7 is a block diagram illustrating operation of a controller or control strategy to update Kalman filter initialization values via cloud computation in response to battery model performance meeting established criteria after convergence of the Kalman filter. In various embodiments, data stored on-vehicle 710 may be communicated by a vehicle transceiver to one or more cloud computation servers 720. Vehicle data may include SOC, battery temperature (T), battery current (I), battery terminal voltage (Vt), Kalman filter parameters (such as for r1, and RCx), Kalman filter limits, covariance, and noise, for example. Vehicle data may be pushed from the vehicle to the cloud server(s) as represented at 722 periodically, or in response to particular trigger conditions, such as vehicle power off or key cycle, vehicle operating parameters exceeding a threshold, a vehicle diagnostic code or fault condition, etc. In one embodiment, vehicle data is pushed to the cloud 720 when battery model performance meets designated performance criteria, which may be indicative of model values matching actual measured values, for example. The vehicle data may be analyzed by the cloud server(s) 720 to identify parameters that support convergence of the Kalman filter as represented at 724. The cloud server(s) may perform a fitting algorithm to fit learned model parameters to the vehicle parameter storage structure and associate parameter limits using look-up tables (LUTs), curve fitting equations, etc. with a decay filter or forgetting factor applied to older data as represented at 726.

If the new values/parameters deviate significantly from the old/previous values, or if the fit of the learned parameters to the parameter storage structure is poor, as determined at 728, then a user message may be generated and communicated to the vehicle and/or support personnel as represented 740. Otherwise, an updated map having the new values/parameters is pushed to the vehicle as represented at 750 for use in subsequent vehicle operation. The updated map may be loaded in response to a subsequent key-on, for example.

As illustrated by the representative embodiment illustrated in FIG. 7, new data including Kalman Filter initialization values (parameters, limits, covariance, gain, etc.) and battery states (SOC, temperature, current, and terminal voltage) are pushed to and stored in the cloud. In the cloud, data that represents instances where Kalman Filter estimates have converged is identified and combined with similar older data from the same vehicle. To prevent new data from being discredited by out-of-date data, a forgetting factor is applied to data based on age. Learned parameters from the Kalman Filter output are then fit to the parameter storage structure (lookup table, function, etc.) for the particular vehicle. After values are successfully fit, the values are then compared to the previously saved values. If there is a significant or unexpected deviation, a notification is generated and communicated to a responsible battery service team and to the user to investigate. If there is no unexpected deviation, the updated values are pushed to the vehicle for use.

Figure 8:
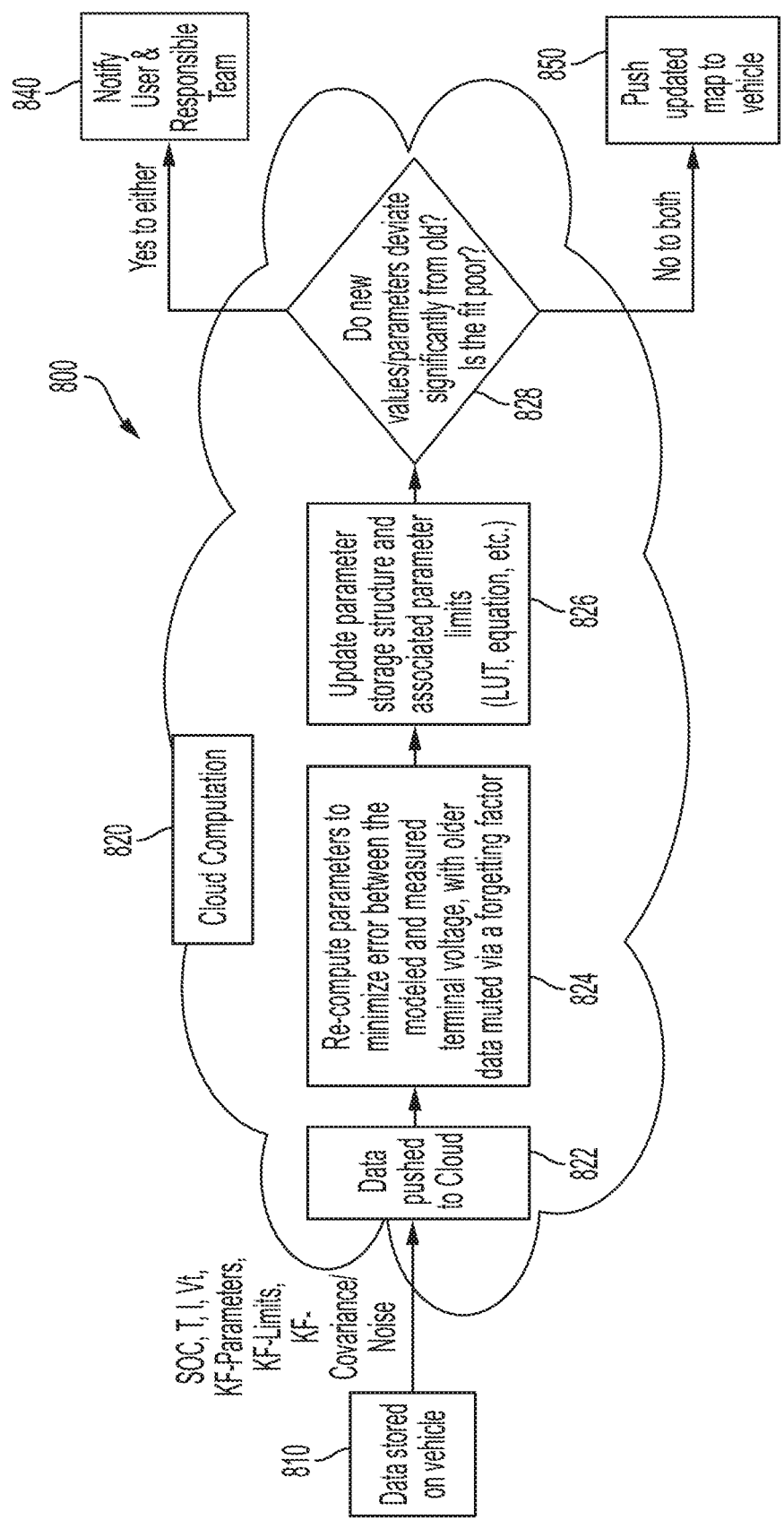
FIG. 8 is a block diagram illustrating operation of another controller or control strategy to update Kalman filter initialization values via cloud computation.

A variation of the strategy illustrated in FIG. 7 is shown in the diagram of FIG. 8, where instead of using the learned parameters to update the stored initialization values, new initialization values are computed separately from the active drive cycle to minimize mismatch between the modeled and measured terminal voltage, and then update the stored values. For this or a similarly complicated procedure, an update can be completed on a scheduled basis (e.g. monthly, bi-monthly, or annually) or when model estimation accuracy has degraded past a certain threshold. Strategy 800 includes storing vehicle data 810 and pushing data to cloud server(s) 820 as represented at 822. Vehicle data may be pushed periodically or in response to a trigger condition similar to those conditions described with respect to FIG. 7. Battery model parameters may be recomputed to minimize error between the modeled and measured battery terminal voltage, with a forgetting factor applied to older data as represented at 824. The parameter storage structure and associated parameter limits may be updated at 826 based on the computations at 824. If the new values/parameters deviate significantly from the old values, or if the curve fit is poor as represented at 828, an associate message may be provided to the user and support personnel as represented at 840. Otherwise, the updated map with the new values/parameters is pushed wirelessly to the vehicle via a vehicle transceiver as represented at 850. The new map may then be loaded into active memory in response to a trigger condition, such as a vehicle key-on, for example, for use during operation of the vehicle by the vehicle controller to control at least one of the vehicle traction battery and electric machine.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable and non-transitory storage media such as ROM devices and information alterably stored on writeable, non-transitory storage media such magnetic disks or tapes, solid-state memory or drives, CDs, RAM devices, flash memory and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a traction battery having a plurality of cells;
a temperature sensor configured to measure battery temperature of the traction battery;
a current sensor configured to measure battery current flow to and from the traction battery;
a voltage sensor configured to measure output terminal voltage of the traction battery;
an electric machine powered by the traction battery and configured to provide propulsive power to the vehicle; and
a controller configured to control at least one of the electric machine and the traction battery in response to an estimated battery power capability based on a battery model having a plurality of model parameters reinitialized in response to at least one of the plurality of model parameters having a value exceeding a corresponding limit for the at least one model parameter.

2. The vehicle of claim 1 wherein the controller is further configured to reinitialize the plurality of model parameters in response to a change in battery current exceeding a corresponding threshold.

3. The vehicle of claim 1 wherein the plurality of model parameters comprises a first resistance, a second resistance, and a capacitance of the battery model, wherein the first resistance is in series with the second resistance and the capacitance is in parallel with the second resistance.

4. The vehicle of claim 3 wherein the controller is further configured to adjust the first resistance, the second resistance, and the capacitance during operation of the vehicle using a Kalman filter.

5. The vehicle of claim 4 wherein the controller controls at least one of the electric machine and the traction battery in response to a state of charge (SOC) of the traction battery, the SOC based on the plurality of model parameters, the battery temperature, the battery current, and the battery terminal voltage.

6. The vehicle of claim 3 wherein each of the plurality of model parameters is reinitialized to a previously stored value.

7. The vehicle of claim 3 further comprising a transceiver configured to wirelessly communicate vehicle data to a cloud server, wherein each of the plurality of model parameters is reinitialized to a value received from the cloud server.

8. The vehicle of claim 1 further comprising an internal combustion engine coupled to the electric machine.

9. A vehicle comprising:
a traction battery;
a temperature sensor configured to measure battery temperature of the traction battery;
a current senor configured to measure battery current flow to and from the traction battery;
a voltage sensor configured to measure output terminal voltage of the traction battery;
an electric machine powered by the traction battery and configured to provide propulsive power to the vehicle; and
a controller configured to control at least one of the electric machine and the traction battery in response to a battery state of charge (SOC) estimated using a battery model including a first resistance in series with a second resistance and a capacitance in parallel to the second resistance, wherein the first resistance, second resistance, and the capacitance are initialized to corresponding values in response to at least one of the values crossing a corresponding battery model parameter value limit and a change in the battery current exceeding a corresponding threshold.

10. The vehicle of claim 9 wherein the first resistance, the second resistance, and the capacitance values are adjusted during operation of the vehicle based on a Kalman filter.

11. The vehicle of claim 10 wherein values for the first resistance, the second resistance, and the capacitance values are received wirelessly by the controller from a cloud server.

12. The vehicle of claim 9 further comprising an internal combustion engine.

13. The vehicle of claim 12 wherein the controller is further configured to determine a battery power capability based on the first resistance, the second resistance, and the capacitance.

14. The vehicle of claim 13 wherein the first resistance, the second resistance, and the capacitance are determined as a function of the battery temperature, the battery current, and age of the traction battery.

15. A method for controlling an electrified vehicle, comprising, by a controller:
initializing traction battery model parameters for a first resistance, a second resistance, and a capacitance in response to a vehicle key-on;
controlling at least one of an electric machine and the traction battery in response to a battery state of charge (SOC) and a battery power capability estimated using the battery model including the first resistance in series with the second resistance and the capacitance in parallel to the second resistance, wherein the first resistance, the second resistance, and the capacitance are adjusted during operation of the vehicle using a Kalman filter, and wherein the first resistance, the second resistance, and the capacitance are re-initialized to associated values in response to a change in the battery current exceeding a corresponding current threshold, and in response to at least one of the first resistance, the second resistance, and the capacitance exceeding respective first resistance, second resistance, and capacitance limit thresholds.

16. The method of claim 15 wherein at least one of the SOC and the battery power capability are determined as a function of temperature of the traction battery.

17. The method of claim 16 wherein at least one of the SOC and the battery power capability are determined as a function of age of the traction battery.

18. The method of claim 17 wherein at least one of the SOC and the battery power capability are determined as a function of traction battery current.

19. The method of claim 18 further comprising wirelessly receiving values to initialize the first resistance, the second resistance, and the capacitance from a cloud server.

* * * * *